United States Patent
Shibamori et al.

(10) Patent No.: US 7,657,841 B2
(45) Date of Patent: Feb. 2, 2010

(54) MONITOR DISPLAY FOR CONSTRUCTION MACHINE

(75) Inventors: Kazuhiro Shibamori, Ibaraki (JP); Keiichiro Nakamura, Ibaraki (JP); Tsuyoshi Sakyo, Ibaraki (JP); Kazunori Nakamura, Ibaraki (JP); Tadatoshi Shimamura, Ibaraki (JP); Genroku Sugiyama, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 218 days.

(21) Appl. No.: 11/547,830

(22) PCT Filed: Apr. 15, 2005

(86) PCT No.: PCT/JP2005/007292

§ 371 (c)(1),
(2), (4) Date: Oct. 19, 2006

(87) PCT Pub. No.: WO2005/103397

PCT Pub. Date: Nov. 3, 2005

(65) Prior Publication Data

US 2007/0168101 A1 Jul. 19, 2007

(30) Foreign Application Priority Data

Apr. 19, 2004 (JP) .............................. 2004-123120

(51) Int. Cl.
*G06F 3/00* (2006.01)
*G06F 9/00* (2006.01)
*G06F 17/00* (2006.01)

(52) U.S. Cl. .................. 715/771; 715/778; 715/764; 701/1; 700/1

(58) Field of Classification Search ................. 715/771, 715/764, 778; 701/1; 700/1
See application file for complete search history.

(56) References Cited

U.S. PATENT DOCUMENTS

2005/0154505 A1 * 7/2005 Nakamura et al. ............. 701/1

FOREIGN PATENT DOCUMENTS

| JP | 05-296779   | 11/1993 |
|----|-------------|---------|
| JP | 11-081393   | 3/1999  |
| JP | 2002-002416 | 1/2002  |
| JP | 2003-027531 | 1/2003  |
| JP | 2004-010281 | 1/2004  |

* cited by examiner

*Primary Examiner*—Ting Zhou
*Assistant Examiner*—Sabrina L. Greene
(74) *Attorney, Agent, or Firm*—Antonelli, Terry, Stout & Kraus, LLP.

(57) ABSTRACT

A display device for a construction machine has a display switching means, output control means, operation detecting means, and display prohibiting means. The display switching means switches information displayed on a monitor placed in an operation cabin, where the switching is made to prevent display of unnecessary information on the monitor while the construction machine is performing work. The output control means selects display information recorded in information recording means and outputs the selected information to the monitor. The operation detecting means detects whether or not the construction machine is in a working state. When the operation detecting means detects that the construction machine is in the working state, display switching operation of the monitor is performed by the display switching means, and the display prohibiting means prohibits the display of specific information.

9 Claims, 5 Drawing Sheets

MONITOR DISPLAY FOR CONSTRUCTION MACHINE

FIELD OF THE ART

This invention relates to a monitor display for use in a cab of a construction machine like a hydraulic power shovel type excavator, for example, to let an operator recognize a variety of necessary information for operating the machine.

TECHNICAL BACKGROUND

Taking a hydraulic power shovel type excavator as an example of construction machines, as well known in the art, a hydraulic pump is driven by an engine to supply pressurized oil from the hydraulic pump to hydraulic cylinders and hydraulic motors as actuators in various operating parts of the machine, which are operated by way of control levers or other operation control means manipulated by an operator who is seated within an operating room or cab of the machine.

Normally, a variety of instruments are mounted in the cab to let an operator recognize operating conditions of the machine. For example, the instruments in the cab include an engine speedometer, fuel indicator, cooling water temperature indicator, operating oil temperature indicator and hour meter. In this regard, it is more rational to display readings of various instruments collectively at a prominent place rather than using separately mounted indicators, which would scatter the operator's attention. With recent price down and improvements in accuracy as a display device, liquid crystal displays have been favorably adopted and put in use as a monitor screen which displays various operating conditions of a machine and other necessary information collectively by way of color images. By the introduction of a monitor display of this sort, it has become possible to put various information on a monitor screen in a compact and easily recognizable form, permitting an operator to grip current operating conditions of a machine accurately.

Patent Literature 1: Japanese Laid-Open Patent Application H11-81393

DISCLOSURE OF THE INVENTION

Objects of the Invention

The information or contents on display on a monitor screen can be switched from one content to another, so that a monitor display can be arranged to display various information on a monitor screen in addition to above-mentioned operating conditions of a machine. Especially in the case of construction machines which have a trend toward multi-function and multi-purpose machines, it would help to improve the maneuverability of a machine to a considerable degree if information or data of various functions are displayed on a monitor screen. In addition, from the standpoint of efficiency and safety of operations, it is desirable for a monitor display to be able to display various information and contents on a monitor screen. Although a cab on a construction machine is a relatively narrow space, it is necessary for the cab to command as broad a view of outer surroundings as possible. Therefore, it is desirable and rational to provide a monitor screen within a cab in association with a contents switch means to display various operational data and information selectively on a monitor screen.

Even in a case where arrangements are made to display various operational data and information on a monitor screen as mentioned above, the contents which can be displayed on a monitor screen during operation of a construction machine, for example, are limited, and certain contents should be displayed when the machine is in an idling state or when the machine is not in operation. If a contents switch means is erroneously touched or manipulated during an operation of the machine to display operational data and information which are irrelevant to a current operation, the operator could rather be confused by the display of irrelevant data or information.

It is therefore an object of the present invention to provide a monitor display which is arranged to display a variety of operational data and information selectively on a viewing screen, the monitor display being particularly arranged to prohibit displaying on a monitor screen those contents which are irrelevant to a current operation of a construction machine, securely preventing an operator from being confused by erroneous display of unnecessary information when the construction machine is in operation.

Means For Solving Problems

In accordance with the present invention, for achieving the above-stated objective, there is provided a monitor display to be installed within a cab of a mobile construction machine, adapted to display predetermined information or data stored in an information storage means and other information selectively on a monitor screen, characterized in that the monitor display comprises contents switch means for switching contents of the monitor screen selectively from one category to another; an output control means adapted to output contents of a selected category to the monitor display according to a signal from the contents switch means; a machine status checkout means adapted to check whether or not the construction machine is currently in operation; and a contents prohibiting means adapted to prohibit display of contents of predetermined categories as long as the construction machine is in operation, even if the content switch means is manipulated to select contents of the predetermined categories.

In this instance, contents to be put on the monitor screen can be categorized into basic or primary information concerning current operating conditions of the machine and other non-operational information which should be prohibited from being put on the monitor screen while the machine is in operation. The monitor display is adapted to show the basic information preferentially as a basic monitor screen, which however can be switched to other operation-assisting monitor screens during an operation of the machine if desired. According, upon starting the machine, a basic or primary monitor screen is preferentially put on the monitor display but other operation-assisting contents can be selectively put on the monitor screen by a contents switch means irrespective of whether the machine is in operation or in an idling state. On the other hand, the conditionally prohibited contents can be selected only when it is confirmed that the machine is in an idling state by a signal from a machine status checkout means, cannot be selected by the contents switch means as long as the machine is in operation.

In this instance, irrespective of whether the machine is in operation or in an idling state, the basic information is presented in the form of an operating condition monitor screen which contains at least one of engine cooling water temperature and fuel meter or, in addition thereto, operating oil temperature. If the monitor screen has a display area which is large enough, the basic monitor screen may contain other operating conditions of the machine including a battery consumption level or the like. Further, in case a rear monitor camera is mounted on the construction machine, it can be connected to the monitor display so that an operator can view video images of the rear monitor camera on the monitor screen whenever necessary. In this regard, in a stage preparatory to an operation, it is important to check for safety in the surroundings, so that rear view images from the rear monitor camera can be put on the monitor screen as basic information when it is found that the machine is found to be in an idling state by the machine status checkout means, automatically switching the contents of the monitor screen to basic information on current operating conditions as soon as the machine status checkout means detects a start of machine operation.

The contents switch means can be in the form of a control panel which is wire-connected to the monitor display, but preferably the contents switch means is constituted by a plural number of manual switches which are located around or under the monitor screen. Contents to be put on the monitor screen may include contents for making settings or alterations in relation with operation of the construction machine or of the monitor display. In such a case, one or a plural number of manual switches can be utilized as contents switch means. In case there is a need for making certain settings or alterations in connection with contents on the monitor display, the above-mentioned manual switches may be arranged to function as setting switches, including or excluding the switch or switches which are allotted as content switch means.

In this connection, usually an operator makes various settings when the machine is in an idling state because normally selection of contents concerning information setting items is not allowed while the machine is in operation. However, setting contents include a content like a cab interference preventive content which needs to be viewed while operating a working mechanism of the machine for setting limit values of the working mechanism. Therefore, the monitor display permits selection of contents of this nature when the machine is in an operating state.

The machine status checkout means is adapted to judge whether the machine is in operation or in an idling state, on the basis of engine r.p.m. or oil pressure of a hydraulic actuator of the construction machine or by detecting position of a gate lock lever which is provided at an operator's seat. In the case of a hydraulically driven construction machine, an operating state can be detected from hydraulic actuators which are in action when the machine is in operation, and, in the case of a machine employing an electric motor as a drive means, it can be detected from the electric motor which comes to a stop. On the other hand, in the case of an engine-driven hydraulic construction machine, the engine is in operation but various operating and working mechanisms are still at rest in an idling state. In the case of an all electric construction machine, various operating and working mechanisms are supplied with power but are still at rest when the machine is in an idling state.

Effects of the Invention

Being arranged in the manner as described above, the present invention can securely prevent an operator of a construction machine from being confused by erroneous display of unnecessary operational data or information when the construction machine is in operation.

BEST MODE FOR CARRYING OUT THE INVENTION

Hereafter, the present invention is described more particularly by way of its preferred embodiments with reference to the accompanying drawings. In the following description of preferred embodiments, by way of example the present invention is applied as a monitor display of a hydraulic power shovel type excavator, a typical example of construction machines. Needless to say, application of the monitor display according to the present invention is not limited to hydraulic shovel car type construction machines.

Shown in FIG. 1 is general construction of a hydraulic shovel car as an example of construction machine. In that figure, indicated at 1 is a crawler type base carrier or vehicle, at 2 an upper swing structure, and at 3 a front working mechanism mounted on the upper swing structure 2 and equipped with an excavation means. Also mounted on the upper swing structure 2 is an operating room (a cab) 4 to be occupied by an operator for controlling operations of the machine. Provided within the cab 4 are control means including operation control levers for driving the lower base carrier, for controlling swing motions of the upper swing structure 2 and for controlling operations of boom 3*a*, arm 3*b* and bucket 3*c* of the front working mechanism 3, for example, at the time of a ground excavating operation or other ground work.

A hydraulic shovel car is generally arranged in the manner as described above, and normally has a hydraulic drive system, actuating a hydraulic pump by an engine to supply operating oil to and from hydraulic actuators including hydraulic motor and hydraulic cylinders. Therefore, various sensors are provided for the purpose of detecting operating conditions of the engine, along with sensors which are located at various points of the hydraulic drive system and sensors attached on various operating parts of the front working mechanism 3. Among a diversity of information or data which are acquired from various sensors, there are essential operational data and information which should desirably be recognized by an operator and unessential operational data and information which do not need to be recognized by an operator. The essential information which needs recognition by an operator include information on current operating conditions of the machine. Basically, a certain information on current operating conditions should be recognized by an operator throughout an operation of the hydraulic excavator or shovel car.

Usually, a number of monitor cameras are mounted on a hydraulic shovel car to assist an operator in getting outer views. Indicated at 10 is a monitor camera which is mounted on a counterweight 5 at the rear end of the upper swing structure 2 to provide a rear view for safety checks by an operator who is at the control of the machine within the cab 4. The operator at the control of the machine is seated on an operator's seat 11 within the cab 4, so that he or she can take views relatively easily in a direction forward of the cab 4. However, it is difficult for the operator to take a rear view to a sufficient degree because a machine room housing 5 is located behind the cab 4 and the counterweight 5 is located further on the rear side of the machine room housing 6. The rear monitor camera 10 is provided exclusively for securing a rearward view field for heightening safety and efficiency of operation. Besides the monitor camera 10, other monitor cameras can be attached on the arm 3*b* for the purpose of taking a view of ground portion being excavated or on a lateral side of the machine for providing assistive side views in a lateral direction of the machine.

Further, the hydraulic shovel car is equipped with communication means for wireless communication with a management center or related facilities in a remote place. By provision of wireless communication means, various construction machines including hydraulic shovel cars can be operated under control of a centralized management system, for checking for operating progress of an operation at a working site, for managing expendable supplies and for managing working schedules of construction machines. For this purpose, the hydraulic shovel car is equipped with at least a communication device 12 (FIG. 7) and an antenna 12a. The communication device on the side of the hydraulic shovel car may be either a reception only type or a bilateral communication type.

As shown in FIG. 2, a monitor display 13 like a liquid crystal display is installed within the cab 4 to display thereon above-mentioned various information or contents to be recognized by an operator at the control of the machine. Upon starting the hydraulic shovel car by a starter key, the monitor display 13 is turned on and started to display necessary contents. The monitor display 13 can be viewed all the time while various mechanisms of the hydraulic shovel car are operated by an operator for carrying out a certain operation. During an operation, however, it is necessary for the monitor display not to obstruct forward views or forward visibility of the operator. Therefore, the monitor display 13 is provided with a monitor screen of a relatively small size, and located in an obliquely forward position within the cab 11, for example, located on a right front pillar 7.

The monitor display 13 is controlled by a display controller 20 shown in FIG. 3 to display various contents selectively in a switchable way. More specifically, the display controller 20 is provided with an input control 21, which is adapted to receive detection signals from sensors located at various parts of the vehicle through a vehicle body network 22, and provided with a video signal input terminal 23 for receiving video signals from the monitor camera 10 (and the monitor camera 11) along with a communication terminal 24 for receiving communication signals received by the communication device 12. Further, the display controller 20 is provided with an data input terminal 25 to receive information or data from a personal computer or a data processing system.

Video signals from the monitor camera 10 are fed from the input control 21 to a video signal processing section 26 to generate video signals to be displayed on the monitor screen of the display device, and the generated video signals are stored in a picture memory 27. Further, data of messages received from a machine management center through the communication device 12 are stored in a main memory 28. Furthermore, detection signals from various sensors are sequentially sent to the display controller 20 and fed to a data processing section 29 to detect current conditions of various operating parts, compiling data which are necessary for displaying current operating conditions of the machine and storing the compiled data in the main memory 28. Data of current operating conditions of the machine, fetched from the main memory 28, are sent to a content image generating circuit 30 to generate images to be displayed on the screen of the monitor display 13.

Further, the data processing section 29 is connected to a data comparator 31 which is adapted to take in necessary numerical data selectively for checking and spotting abnormal conditions among various data input to the data processing section 29 from a variety of sensors. Preset in the data comparator 31 are criterion numerical data which are necessary for detection of abnormalities. Current numerical data coming into the data comparator 31 are compared with the preset criterion numerical data to make a judgement as to whether or not an abnormal situation has occurred. Thus, the data comparator 31 constitutes an abnormality detection means. When an abnormal state is detected as a result of comparison by the data comparator 31, a corresponding alert message is generated by a message generator 32 for display on the monitor screen.

Further, from a personal computer which is connected to the data input terminal 25, a variety of data can be transmitted and input to the display controller 20. Data to be transmitted to the display controller 20 include maintenance data, diagnostic criterion data for use in troubleshooting, kinds of attachments usable on the front working mechanism 3, moment limiter in crane operation, data for prevention of cab interference. These data are stored in ROM 33 of the display controller 20.

Further, the display controller 20 is provided with an output control 34, through which video signals from the picture memory 27, output signals from the content image generating circuit 30 and an alert message from the message generator 32 are selectively displayed on the screen 13a of the monitor display 13. In order to select contents to be displayed on the monitor screen, a content selector 35 is connected to the output control 34. Picture images of contents selected by the content selector 35 are output from the output control 34 and displayed on the screen of the monitor display 13. The respective constituent sections of the controller 20 are controlled by CPU 36. Although not shown in the drawings, CPU 36 is connected to ROM 33 and at the same time connected to the respective circuits of the controller 20 by a bus line.

By the content selector 35, contents to be displayed on the screen of the monitor display 13 is selected from a variety of information which can be output from the display controller 20. As shown in FIG. 4, connected to the content selector 35 is a selector switch 37 which functions as content switch means. A plural number of selector switches 37 are provided under the screen 13a of the monitor display 13. Contents on display on the monitor screen 13a can be switched by pushing in one of selector switches 37. Further, the content selector circuit 35 is connected to the data processing circuit 29, and, on the basis of a signal from the data processing circuit 29, it judges whether the machine is currently in operation or in an idling state, prohibiting display of certain contents while the machine is in operation. Thus, in this case the content selector 35 constitutes a content prohibition or inhibition means. Shown in FIG. 4 is an example of contents on display, showing an engine cooling water temperature meter, a fuel meter and an operating oil temperature meter along with a clock and an hour meter.

Shown in FIG. 5 are a number of monitor screens with categorized contents to be shown on the monitor display 13. As seen in that figure, categories of information are shown on the monitor screen. FIG. 5 shows merely examples of categorized information or contents to be displayed on the monitor screen. Of course, it is possible to arrange the display controller 20 to deal with and output a greater number of information categories if desired. In the case of FIG. 5, monitor screens include a basic or primary monitor screen shown at the top, operation-assisting monitor screens which can be selected when the machine is in operation, shown on the left side in FIG. 5, and instructional monitor screens which are not allowed to select when the machine is in operation, shown on the right side in the drawing.

Denoted at 40 is a basic monitor screen which displays basic information. In this case, the basic monitor screen 40 contains basic information with regard to current operating conditions of the machine. More specifically, the basic monitor screen 40 contains at least a reading of either engine cooling water temperature or fuel indicator, along with operating oil temperature. These basic screen contents may be displayed as numerical values, but it is preferable to display them by way of analogous indicators which can be more easily recognized by an operator. Since the monitor screen has a breadth to display other information in addition to the three contents just mentioned, the basic screen contents may further include a clock which indicates current time and an hour meter which indicates cumulative operation time.

Indicated at 41 to 43 are monitor screens for contents which can be selected during operation of the machine, i.e., a rear view monitor screen 41, an ML (moment limiter) monitor screen 42 and a cab interference monitor screen 43.

The rear view monitor screen 41 shows a video image which is captured by the rear monitor camera 10 having a view filed in a rearward direction of the hydraulic shovel car. ML monitor screen 42 indicates a load which can be suspended in a posture of the front working mechanism 3 when the power shovel is in a crane operation. More specifically, a maximum suspendable load is indicated on the monitor screen along with an actually suspended load on the front working mechanism 3. Accordingly, at the time of a crane operation, it is necessary to put this ML monitor screen 42 on the monitor display 13. Further, the cab interference monitor screen 42 is provided to limit the range of movements of the front working mechanism 3 to prevent interference, for example, with the cab 4. When the front working mechanism 3 is at work, its movement is limited to prevent the bucket 3c from coming into collision against the cab 4.

In this instance, collision of the bucket 3c against the cab 4 is prevented according to preset control data, which are supplied to the controller 20, for example, from a personal computer which is connected to the data input terminal 25. In case there arises a necessity for limiting the range of actions of the front working mechanism 3 at a working site, for example, to prevent interferences with power cables or architectural objects or to prevent contact with buried pipes, limit values are set up by actually operating the front working mechanism 3 on the working site. Therefore, settings for prevention of interference with the cab are made while actually driving the front working mechanism 3 according to a cab interference monitor screen 43 on the monitor screen 13a. Thus, the cab interference monitor screen 43 should be a content which can be selected when the machine is in operation.

Indicated at 44 to 38 are a maintenance screen, a troubleshooting screen, attachment selection screen, a communication dialogue screen and a clock setting screen, which are not allowed to select when the machine is in operation.

The maintenance screen 44 displays timings of replacements of various equipments and components which are provided on the hydraulic shovel car for a limited service life, for example, timing for replacing oil filters and timing for replacing engine oil. Dates of previous replacements and time intervals between replacements and time durations until next replacements are also displayed on the screen.

The troubleshooting screen 45 displays information as to whether or not any one of sensors on operating parts of the hydraulic shovel car is in trouble.

Beside a ground excavating bucket 3c, other attachments such as drill, breaker or cobbing tool can be replaceably attached to the arm 3b of the front working mechanism 3. When an attachment is replaced, there may arise a necessity for limiting the maximum delivery rate of the hydraulic pump or for putting a certain limit on the drive system. Therefore, after replacement of an attachment, it is necessary for an operator to recognize what tool is currently attached to the front working mechanism 3. Further, at this time, an attachment selection screen 46 is put on the monitor screen 13a to make a setting of a selected attachment by way of the selector switch 37.

The communication dialogue screen 47 displays on the monitor screen 13a various commands and informative data which are received from a management center through the communication device 12 on the hydraulic shovel car.

Furthermore, the clock setting screen 48 is used, for example, at the time of adjusting or correcting a current time which is indicated on the monitor screen 13a.

As described above, the monitor display 13 is arranged to display a diversity of information contents on its screen. The basic monitor screen 40 is put preferentially on as soon as the hydraulic shovel car is started, and continuously displayed, uninterrupted no matter whether the machine is in an idling state or in operation.

When the basic monitor screen 40 is on the screen of the monitor display 13, if the selector switch 37 is manipulated to select one of rear view monitor screen 41, ML monitor screen 43 and cab interference monitor screen 43, which are selectable during operation of the machine, the basic monitor screen 40 is switched to a selected one no matter whether the machine is in an idling state or in operation. Especially at the time of driving the vehicle in a reverse direction or at the time of swinging the upper swing structure, a switch to a rear view monitor screen 41 is desirable for the sake of a safety check in the rearward direction. Further, in case the hydraulic shovel car is going to be used for a crane operation, it is desirable to switch the monitor display to the ML monitor screen 42 to carry out a crane operation safely in an efficient manner. Further, the cab interference monitor screen 43 is displayed at the time of setting limit values by operating the front working mechanism 3 on a working site. If display of these operation monitor screens become unnecessary, the monitor display 13 can be switched to the basic monitor screen 40 by manipulating the content selector switch 37.

Even if the content selector switch 37 is manipulated to switch the monitor display to a maintenance screen 44, troubleshooting screen 45, attachment selection screen 46, communication dialogue screen 47 or a time setting screen 46, a switch to one of these screens is prohibited as long as the hydraulic shovel car is in operation. Namely, by a signal from the data processing section 29, the contents selector 35 checks whether the hydraulic shovel car is currently in an idling state or in operation, prohibiting to switch the monitor display 13 to any one of maintenance screen 44, troubleshooting screen 45, attachment selection screen 46, communication dialogue screen 47 and time setting screen 48 when the machine is in operation. That is to say, the contents selector 35 validates selection of these screens by way of the selector switch 37 only when the hydraulic shovel car is in an idling state, and invalidate when the machine is in operation.

Whether the hydraulic shovel car is in an idling state or in operation is recognized by the contents selector 35 from a gate lock position signal among signals which are fed to the data processing section 29 from the vehicle body network 22, and from the engine speed and state of oil pressure in hydraulic actuators. Even if the above-mentioned contents are prohibited during operation of the hydraulic shovel car, the prohibition will not give rise to any problem in particular in carrying out a required operation. During an operation of the machine, it is rather necessary and desirable to display the basic monitor screen 40 or other selectable operation monitor screen to carry out an operation safely and efficiently. By arranging the monitor display 13 in this manner, among a variety of contents to be put on the monitor display, certain unnecessary contents are prohibited from being put on the screen of the monitor display 13 during operation of the machine to prevent confusion on the part of the operator and to prevent unnecessary switching in search for necessary information. Thus, the monitor display 13 is arranged to let an operator grip necessary information efficiently, getting rid of nuisance and fatigue which the operator might feel in getting informed of necessary operating conditions.

In case the hydraulic shovel car is in an abnormal state, for example, when the engine is overheated due to an increase of engine cooling water temperature, it is desirable to display an abnormality information by overlaying the information on an operation monitor screen which is currently put on the monitor display 13, including the basic monitor screen 40, or by interrupting a current operation monitor screen. This is the reason why the display controller 20 is provided with the message generator 32.

In this regard, it is necessary to take into consideration that a hydraulic shovel car which is in an idling state in quite different situations from a hydraulic shovel car which is in operation. Namely, in an idling state, it is not necessarily essential to display engine cooling water temperature, fuel indicator and operating oil temperature. In an idling stage preparatory to a working stage, it is more important to check out and confirm safety around the machine. Therefore, it is desirable to arrange the monitor display to display different contents in an idling stage as compared with contents which are displayed when the machine is in operation. For example, arrangements may be made to put on the rear view monitor screen 41 as a temporary basic monitor screen while a machine is in an idling state, switching the monitor display automatically to the original basic monitor screen 40 containing engine cooling water temperature, fuel indicator and operating oil temperature as soon as an operation of the machine is started, more specifically, as soon as a shift from an idling stage to an operating stage is detected by the contents selector 35. Of course, the rear view monitor screen 41 on display during an idling stage can be switched to the original basic monitor screen 40 by way of the selector switch 36.

DESCRIPTION OF REFERENCE NUMERALS

Figure 1:
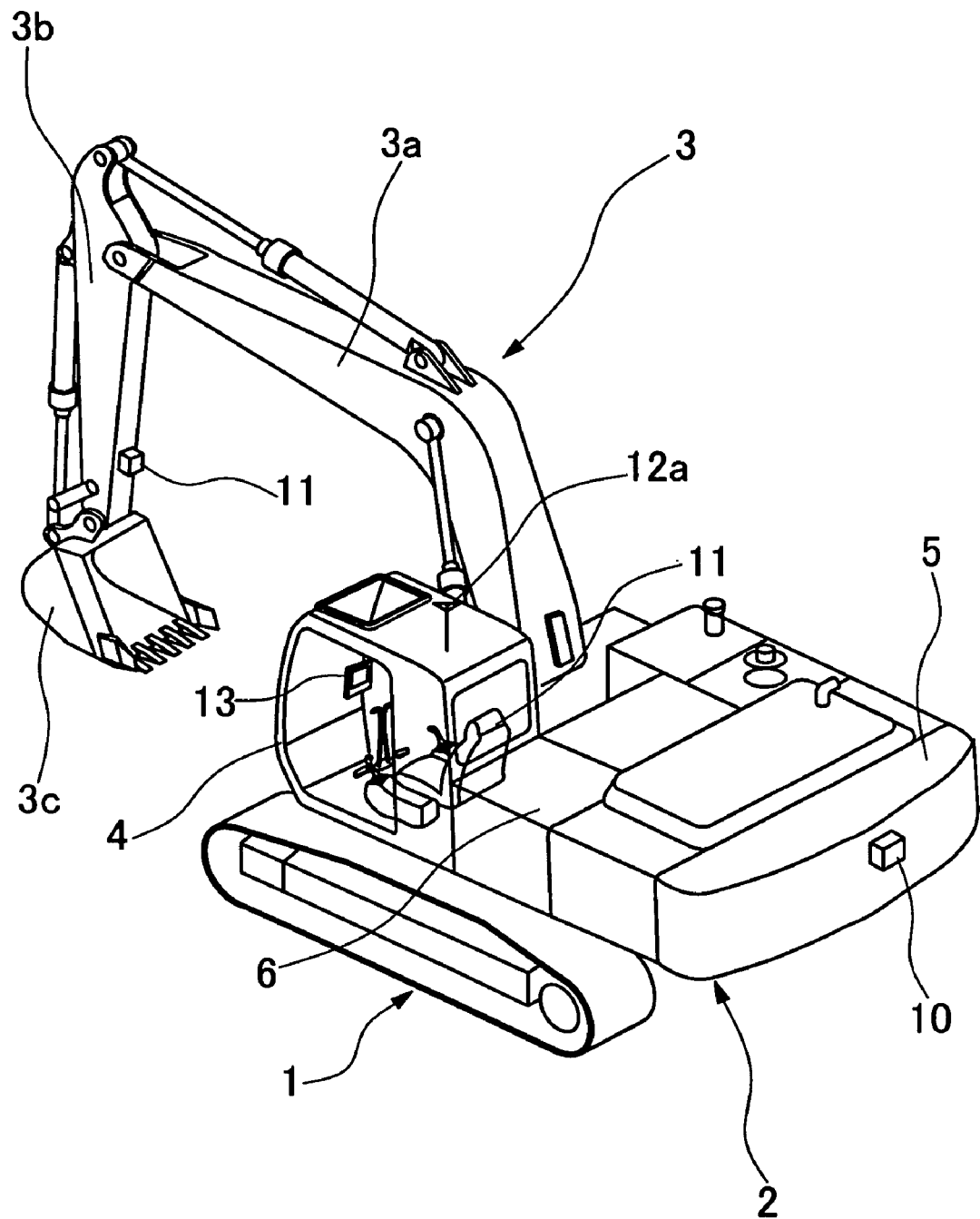
[FIG. 1] A schematic view of a hydraulic power shovel excavator, shown as an example of construction machines to which the present invention is applicable.
Figure 2:
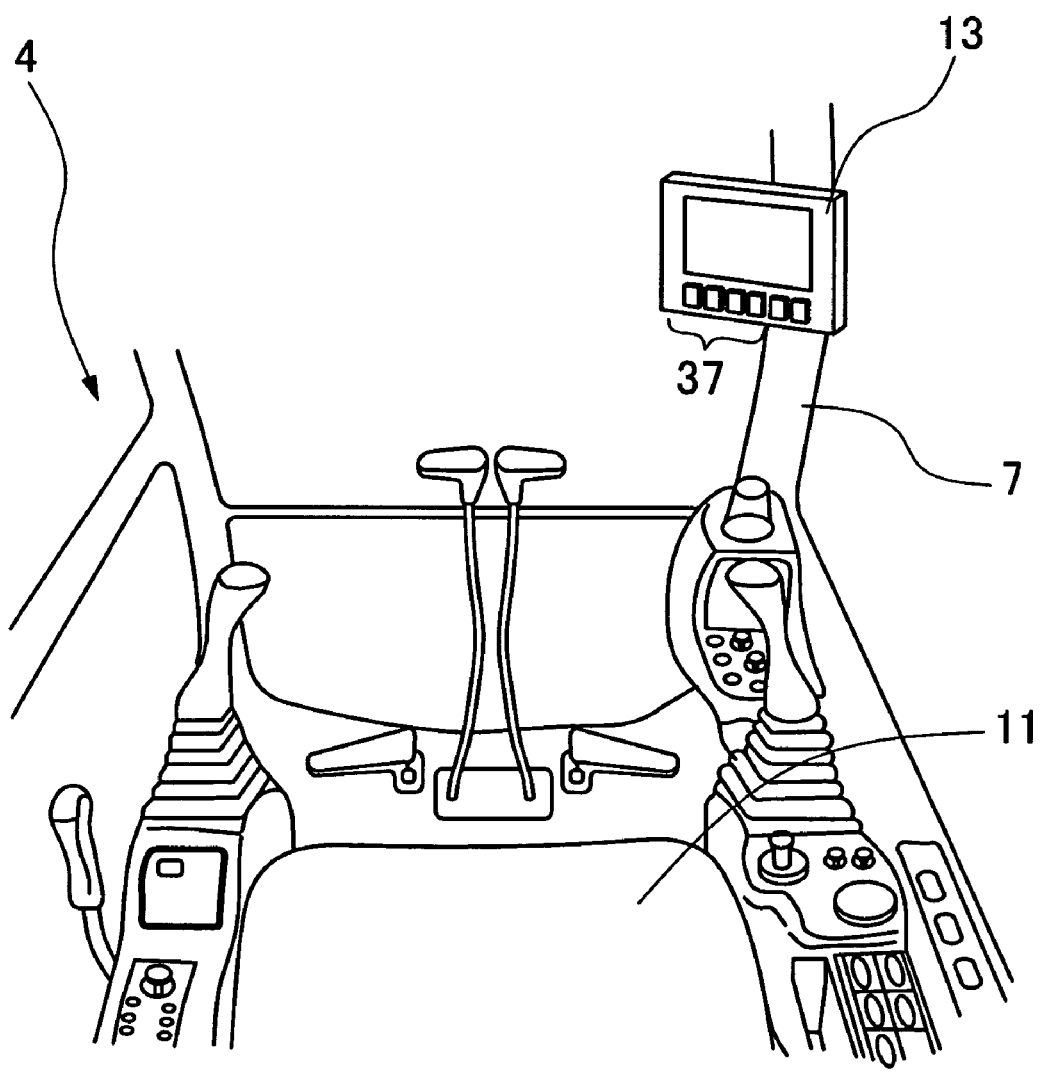
[FIG. 2] A schematic view of a cab of the hydraulic power shovel excavator, showing interior equipments of the cab.
Figure 3:
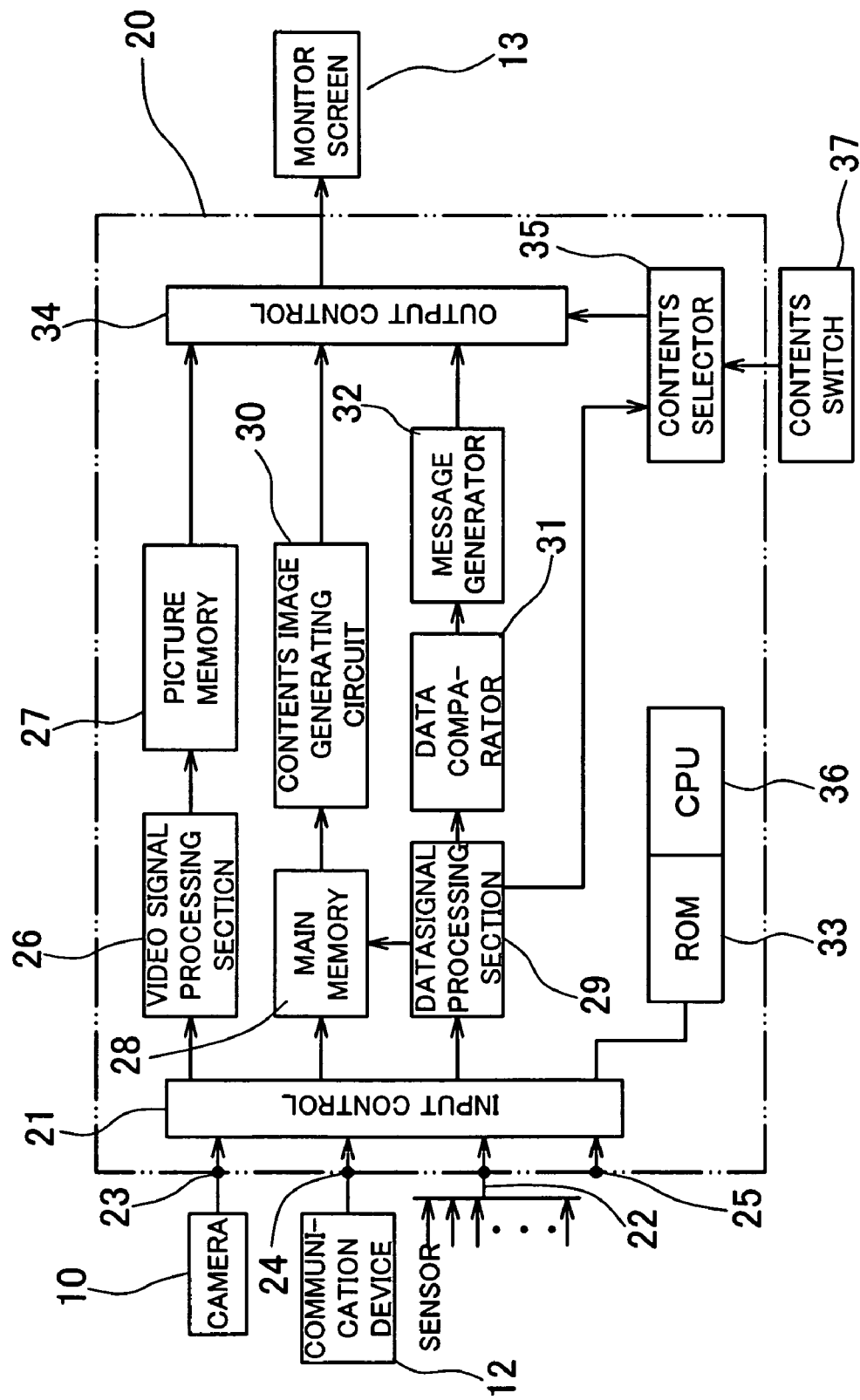
[FIG. 3] A circuit diagram of a display controller.
Figure 4:
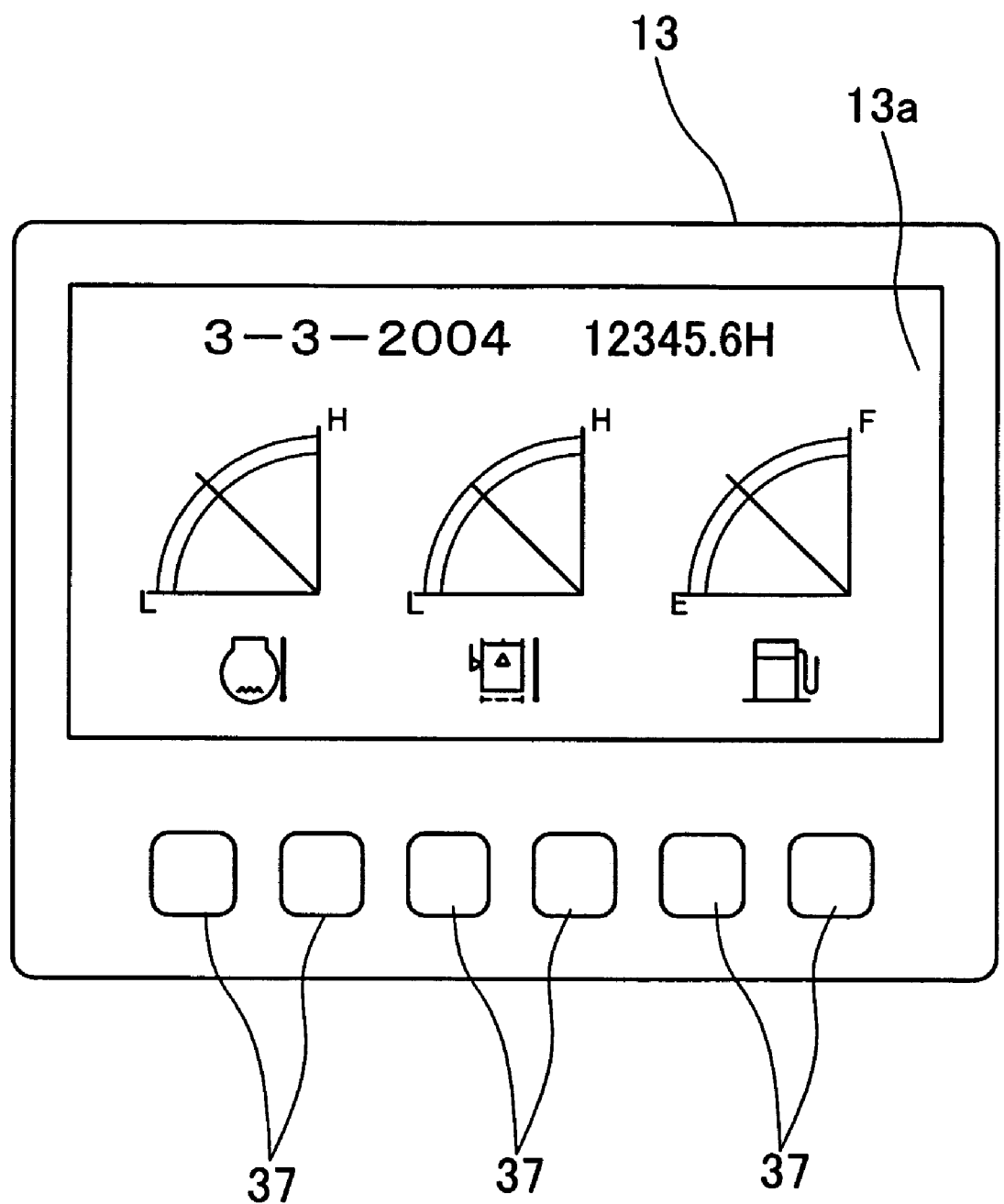
[FIG. 4] A schematic view of a monitor display.
Figure 5:
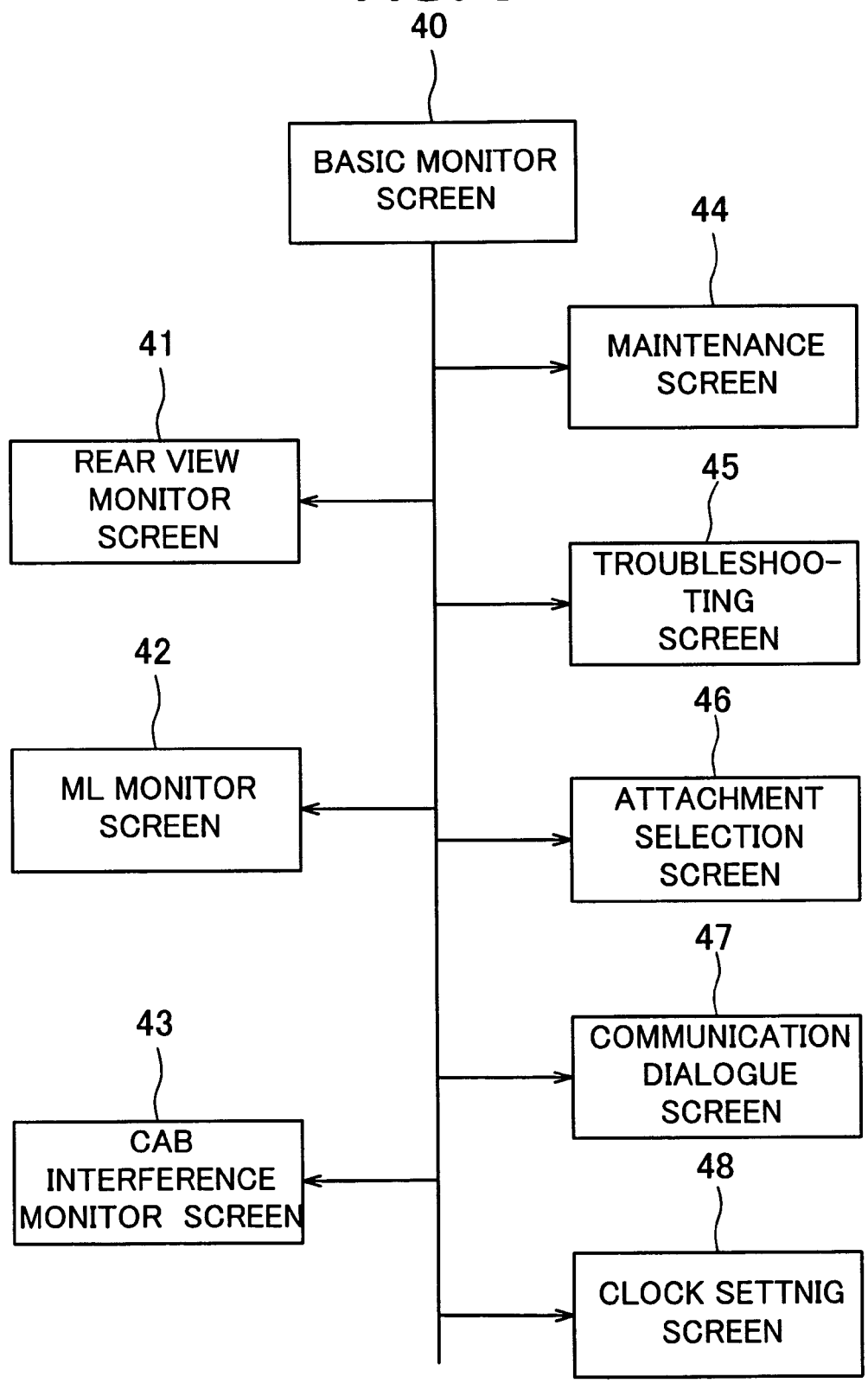
[FIG. 5] A diagrammatic illustration of a number of monitor screens to be put on the monitor display, categorized contents by contents.

| | |
|---|---|
| 1: Vehicular base carrier | 2: Upper swing structure |
| 3: Front working mechanism | 4: Operating room or cab |
| 10: Monitor camera | 11: Operator's seat |
| 13: Monitor display | 20: Display controller |
| 35: Contents selector | 37: Selector switch |
| 40: Primary or basic screen | 41: Rear view monitor screen |
| 42: ML monitor screen | 43: Cab interference monitor screen |
| 44: Maintenance screen | 45: Troubleshooting screen |
| 46: Communication dialogue screen | 47: Time or clock setting screen |

What is claimed is:

1. A monitor display to be installed within a cab of a mobile construction machine, adapted to selectively display sets of information including at least one of predetermined information stored in an information storage means and other information, characterized in that said monitor display comprises:
    a contents switch means for switching contents of said monitor display selectively from one set of information to another, wherein each set of information constitutes a screen;
    an output control means adapted to output contents of a selected screen to said monitor display according to a signal from said contents switch means;
    a machine status checkout means adapted to determine whether said mobile construction machine is currently in an operating state or in an idling state;
    a contents prohibiting means adapted to prohibit display of certain screens as long as said mobile construction machine is in an operating state, even if said switch means is manipulated to select any of said certain screens;
    wherein a plurality of said screens are categorized into one group including operation monitor screens, that are permitted to be selected during any of an operating state and an idling state of said mobile construction machine, and are arranged to display information including basic information and operation-assisting information;
    wherein a plurality of said screens are categorized into another group including instructive screens and setup screens, that are prohibited to be selected during an operating state of said mobile construction machine, but are permitted to be selected during an idling state of said mobile construction machine, and are arranged to display information including instructive information and setup information; and
    wherein said output control means is adapted to display a basic monitor screen preferentially to other operation monitor screens, while permitting to switch between said basic monitor screen and any one of other operation monitor screens by said contents switch means regardless of whether said mobile construction machine is in an operating state or in an idling state, and while permitting to switch to any one of said instructive screens and setup screens only when said mobile construction machine is in an idling state.

2. A monitor display as defined in claim 1, wherein said basic information is information on operating conditions of said mobile construction machine, including at least one of an engine cooling water temperature meter, a fuel meter, an operating oil temperature meter, a clock, and an hour meter.

3. A monitor display as defined in claim 1,
    wherein said monitor display is connected to a rear monitor camera set on said mobile construction machine to provide a rear view for an operator within said cab;
    wherein said output control means is adapted to display rear view images from said rear monitor camera as a screen on said monitor display when said mobile construction machine is detected as being in an idling state by said machine status checkout means; and
    wherein said output control means is adapted to switch said monitor display to a basic monitor screen that shows contents of machine operating conditions including at least one of an engine cooling water temperature meter, a fuel meter, an operating oil temperature meter, a clock, and an hour meter, as soon as said machine status checkout means finds said mobile construction machine to be currently in an operating state.

4. A monitor display as defined in claim 1,
    wherein said contents switch means is constituted by one of a plural number of manual switches provided alongside said monitor display; and wherein said contents switch means is adapted to function also as a setup switch when making a setup or alteration in connection with contents displayed on said monitor display.

5. A monitor display as defined in claim 4,
wherein contents to be displayed on said monitor display include a cab interference screen containing information for prevention of interference with the cab; and
wherein said manual switches are adapted to function also as switches for setting operational limit values of said mobile construction machine.

6. A monitor display as defined in claim 1,
wherein said machine status checkout means is adapted to check whether the mobile construction machine is currently in an operating state or in an idling state through at least one of detection of engine speed, detection of pressure of a hydraulic actuator, and detection of position of a gate lock lever provided on or beside an operator's seat.

7. A monitor display as defined in claim 1,
wherein said operation monitor screens include a basic monitor screen, a rear view monitor screen, a moment limiter (ML) monitor screen, and a cab interference monitor screen.

8. A monitor display as defined in claim 1,
wherein said instructive screens include a maintenance screen, a troubleshooting screen, and a communication dialogue screen.

9. A monitor display as defined in claim 1,
wherein said setup screens include an attachment selection screen, and a clock setting screen.

* * * * *